United States Patent [19]
Hunter et al.

[11] 3,899,569
[45] Aug. 12, 1975

[54] PREPARATION OF HIGHLY PURE TITANIUM TETRACHLORIDE FROM ILMENITE SLAG

[75] Inventors: Willard L. Hunter; Jack C. White; William A. Stickney, all of Albany, Oreg.

[73] Assignee: The United States of America as represented by the Secretary of the Interior, Washington, D.C.

[22] Filed: Feb. 1, 1972

[21] Appl. No.: 222,503

[52] U.S. Cl. .................... 423/76; 423/79; 423/440; 423/492
[51] Int. Cl.² .......................................... C01G 23/02
[58] Field of Search .............................. 423/76–79, 423/75, 76, 77, 78, 79, 80, 439, 440, 492

[56] References Cited
UNITED STATES PATENTS
2,537,229  1/1951  McLaren ................. 75/21
2,928,724  3/1960  Mason et al. ............ 423/79

FOREIGN PATENTS OR APPLICATIONS
4,522  6/1955  Japan ..................... 423/76

OTHER PUBLICATIONS

Barksdale, "Titanium," Ronald Press Co. New York 2nd Edition 1966 pp. 440.

Oreshkin "Obtaining Titanium tetrachloride from titanium carbide" Chemical Abstracts Vol. 21, pp. 2053 (1927).

*Primary Examiner*—Oscar R. Vertiz
*Assistant Examiner*—Brian E. Hearn
*Attorney, Agent, or Firm*—Roland H. Shubert; Donald R. Fraser

[57] ABSTRACT

Calcium-containing titanium ores, such as perovskite, or calcium oxide enriched titania slags are fused with carbon to produce titanium carbide particles within a matrix of calcium carbide. The titanium carbide particles are freed from the fused product by reaction with water and are concentrated by physical means. Chlorination of the titanium carbide concentrate at temperatures below the melting point of impurity metal chlorides yields an extremely pure titanium tetrachloride product.

7 Claims, 2 Drawing Figures

PREPARATION OF HIGHLY PURE TITANIUM TETRACHLORIDE FROM ILMENITE SLAG

BACKGROUND OF THE INVENTION

The major uses of titanium tetrachloride at this time are for the manufacture of titanium dioxide pigments and for titanium metal production. Rutile is now the primary source of titanium tetrachloride since titania slags derived from the smelting of the other major commercial ore of titanium, ilmenite, are not suitable for chlorination but must be treated by the sulfate process.

World supplies of rutile appear to be limited and the known rutile reserves within the United States are small. However, large domestic reserves of ilmenite and other titanium minerals such as perovskite and titanite do exist. While ilmenite has been utilized for the production of pig iron and of titanium dioxide pigments, using the sulfate process, it has never been commercially feasible to utilize ores such as perovskite as a source of any titanium compounds. The high calcium oxide content of both perovskite and titanite precludes their use as feed for either the chloride or sulfate process. The desirability of developing techniques for utilizing ilmenite slags and other titanium ores to produce titanium tetrachloride has long been recognized and such techniques have been actively sought.

It is an object of our invention to produce titanium tetrachloride from ilmenite, perovskite, titanite and similar ores.

It is another object of our invention to chlorinate a crude titanium carbide concentrate to directly produce a highly pure titanium tetrachloride product.

Yet another object of our invention is to separate titanium carbide from other metal carbides.

Other objects of our invention will be apparent from the following description of our process.

In the accompanying drawings which illustrate specific embodiments of our invention;

FIG. 1 is a diagrammatic flow sheet of our process utilizing ilmenite as a source of titanium for the production of titanium tetrachloride. and FIG. 2 illustrates a process modification appropriate when utilizing perovskite or titanite as the titanium source.

DETAILED DESCRIPTION OF THE INVENTION

Figure 1:
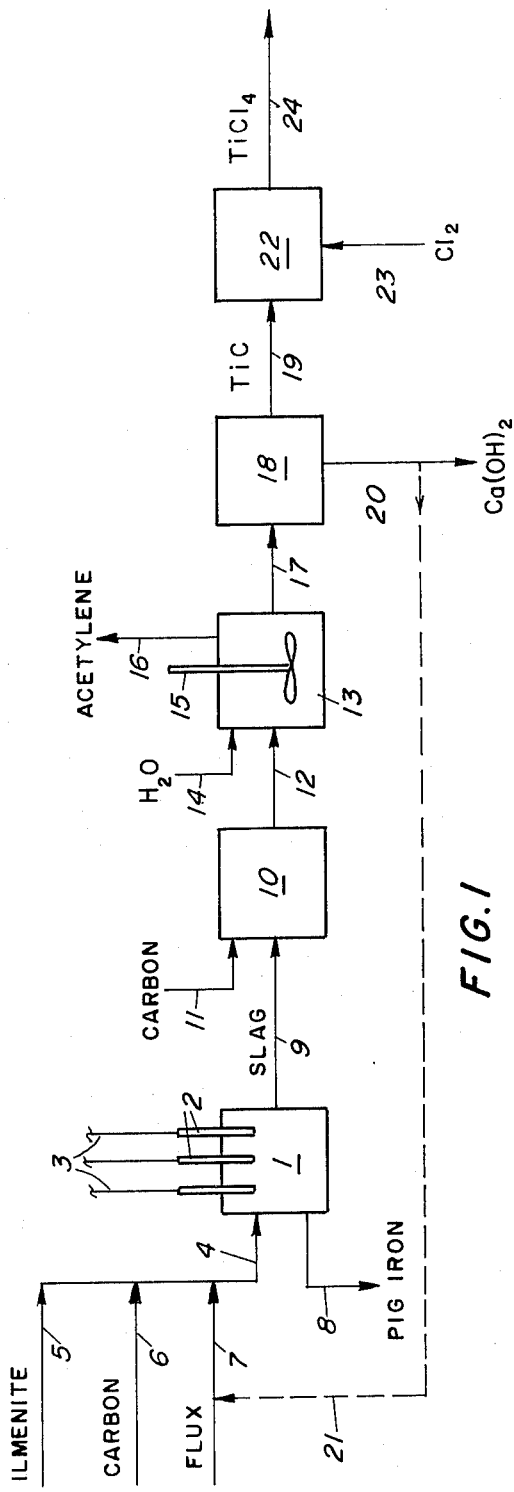

In the broadest embodiment of our invention, calcium and titanium oxides either in physical admixture or chemical combination are reacted with carbon at high temperature to form the respective carbides. The mixed carbide product is then cooled, comminuted, and reacted with water which decomposes calcium carbide to liberate particulate titanium carbide with the concomitant production of acetylene gas and finely divided calcium hydroxide. A titanium carbide concentrate is then recovered from the admixutre by physical means such as by elutriation or tabling.

One of the important advantages of our process is that it allows the use of a variety of titanium oxide containing feed materials or ores. Preferred feed materials include calcium oxide enriched ilmenite slag and naturally occurring titanium compounds such as perovskite, which has the nominal composition $CaTiO_3$, and titanite which has the nominal composition $CaTiSiO_5$. These last two ores, while having relative abundance, have never been successfully exploited as a source of titanium and its compounds.

Other than rutile, the major ores of titanium are ilmenite and titaniferous magnetite. These ores are customarily processed by smelting using a carbon reductant in an electric furnace to produce a salable pig iron and a titania-enriched slag product. Such slags will typically contain about 70–75% $TiO_2$, 10–15% FeO and other oxide impurities with the balance being mainly the lower oxides of titanium. Oxide impurities found will depend upon the ore composition but will usually include a few percent each of silica, alumina and manganese oxide. Alkaline earth oxides usually total less than 1%. The slag is used in the manufacture of pigments by the sulfuric acid digestion process but is unsuitable for chlorination because of its high impurity level.

In the smelting of ilmenite and similar ores, it is desirable to effect as complete an iron removal as possible because this not only produces larger quantities of pig iron product but also makes the slag more valuable. However, as iron removal becomes more complete, the slag liquidus temperature increases sharply. For example, smelting of an Idaho ilmenite to a residual iron oxide content of about 3% in the slag required operating temperatures of 1,600° to 1,700°C in order to obtain fluid products which could be tapped readily from the furnace. Adding calcium oxide as a fluxing agent to the furnace charge resulted in a slag having essentially the same residual iron oxide content but the slag liquidus temperature was reduced to 1,325°C. Addition of lime as a flux substantially improved the efficiency of the smelting step but is impractical for use in the conventional process since the resulting slag is undesirable as a feed to a sulfuric acid digestion process because of increased acid usage and product contamination due to the calcium oxide content.

However, in our process, a high calcium oxide content is not only desirable but is necessary for efficient operation. The carbiding step utilized in our process results in the substantially complete conversion of all of the metal oxides to their respective carbides. One major exception is that of silica which tends to be volatilized as SiO and passes from the reaction zone as a gas. Hence the result is a mixture of carbides including those of titanium, calcium, iron and aluminum. We maintain the calcium oxide content of the charge to the carbiding step sufficiently high to form a matrix of calcium carbide within which titanium carbide is dispersed. Temperature of the carbiding step is maintained above the melting point of calcium carbide, or above about 1,850°C, but substantially below the melting point of titanium carbide which is on the order of 3,150°C.

The mixed product from the carbiding step is cooled, comminuted and is then reacted with water. Decomposition of calcium carbide contained within the carbide product to form acetylene and calcium hydroxide liberates titanium carbide in particulate form. Separation of the particulate titanium carbide from other components of the water-reacted carbide mixture can readily be accomplished using a variety of physical separation techniques including elutriation, tabling and dry magnetic separation. Titanium content of the titanium carbide concentrate, reported as the metal, will typically be about 65% corresponding to a titanium carbide concentration of about 80%. Graphite constitutes the major impurity along with small amounts of iron carbide and calcium hydroxide. Titanium recovery in the titanium carbide concentrate, based upon titanium content in the carbiding furnace charge, is on the order of 85–90%.

The titanium carbide concentrate is a nearly ideal feed material for chlorination to form an extremely pure titanium tetrachloride product. Titanium tetrachloride is usually produced by the high temperature chlorination of titanium dioxide concentrate, such as rutile, in the presence of carbon. In the conventional process, impurities such as iron oxides are also chlorinated and volatilized resulting in an undesirable contamination of the titanium tetrachloride product. By careful control of chlorination conditions we are able to recover, directly from the chlorination step, an essentially pure titanium tetrachloride product.

Reaction of titanium carbide with elemental chlorine is exothermic and proceeds spontaneously at satisfactory rates at temperatures as low as 225°C. Since the normal boiling point of titanium tetrachloride is about 136°C, it passes readily from the chlorination zone as a vapor and is recovered by condensation. With the exception of graphite, most of the other impurities contained within the titanium concentrate, particularly iron carbide and calcium hydroxide, are also chlorinated at these conditions. By maintaining the chlorination temperature below the melting point of the impurity metal chlorides, they remain in the solid state during the reaction thus effecting an essentially complete separation of titanium tetrachloride from the other constituents. In a practical sense, this means that the chlorination must proceed at temperatures below the melting point of ferric chloride which is about 306°C. Residue from the chlorination step consists in major portion of carbon along with smaller amounts of ferric chloride, calcium chloride and a variety of other metal chlorides depending upon the type of ore or feedstock utilized. Those residual chlorides may be recovered by further processing. For example ferric chloride may be recovered from the chlorination residue by heating to a temperature on the order of 350°C while passing an inert gas through the residue to carry off the volatilized ferric chloride. Other metal chlorides may be recovered sequentially in like fashion leaving a carbon residue. Alternatively, the remaining metal chlorides may be recovered by water leaching followed by conventional wet chemistry separation techniques.

Referring now to the drawings, FIG. 1 depicts a schematic flow diagram of one embodiment of our process. An electric furnace 1 having electrodoes 2 connected to a power source 3 is utilized for the smelting of a titaniferous, iron containing ore such as ilmenite. The titaniferous charge is introduced into the furnace via means 4 as a mixture of a titaniferous ore such as ilmenite 5, a carbon reductant such as coke 6 and a fluxing agent 7 which may be either limestone or lime. The components making up the furnace charge may be introduced as separate proportioned streams but it is preferred to pelletize the mixture using small amounts of a binder as is well known in the art.

Sufficient carbon must be provided to reduce all of the iron contained in the charge to elemental form. Amount of fluxing agent required is primarily dependent upon the titanium oxide content of the ore but will generally exceed 5% by weight of the furnace charge. Smelting of the furnace charge takes place at temperatures within the general range of about 1,300° to 1,700°C to yield a pig iron fraction 8 and a slag fraction 9, both of which are tapped from the furnace in a liquid state. Smelting conditions are maintained sufficiently severe to yield a slag having a residual iron oxide content of less than 5% and preferably less than 3%. A detailed description of the electric smelting of ilmenite concentrates is found in the Bureau of Mines Report of Investigations 5170 (1955) and techniques described therein are generally applicable to our process.

All of the fluxing agent added to the furnace charge reports to the slag fraction. The calcium oxide containing slag fraction 9 is then charged to a carbiding furnance 10 together with a source of carbon 11. The minimum amount of carbon added is that amount needed to satisy the stoichiometric conversion of calcium and titanium oxides present in the slag to their respective carbides with concurrent evolution of carbon monoxide. In practice it has been found that actual carbon requirements are about 110 to 150% of theoretical. Furnace 10 may comprise an arc furnce or a shaft furnace similar to those employed for the production of silicon carbide. Carbiding temperatures are maintained above the melting point of calcium carbide or above about 1,850°C. Calcium oxide content of the slag fraction must be sufficiently high to form a semicontinuous and preferably a continuous matrix of liquid around the solid titanium carbide particles formed during the carbiding step. In order to form such a matrix, it is necessary that the slag fraction contain at least about 10% and preferably more than 15% calcium oxide by weight. Calcium oxide content may range as high as 50% or more but little process advantage is gained at these higher calcium oxide concentrations. We prefer to operate our process with a calcium oxide content in the slag within the range of about 20 to 35% by weight.

A mixed carbide product 12 is removed from furnace 10, is cooled and crushed and thereafter introduced into reactor means 13 together with a water stream 14. Reactor 13 comprises a closed vessel having agitation means 15 and vent means 16 for removing acetylene from the vessel. Reaction of calcium carbide with water results in the production of acetylene gas, which may be recovered as a valuable by-product of our process, and the freeing of titanium carbide particles from the matrix. Besides acetylene, the reaction products include calcium hydroxide in a very finely divided form. After reaction of calcium carbide with water is complete, the reaction slurry containing relatively large particles of titanium carbide and substantially smaller calcium hydroxide particles is passed via conduit means 17 to separation device 18. Device 18 preferably comprises an elutriation apparatus which is well suited for at least a preliminary separation of titanium carbide from other components in the slurry. Elutritation is favored for the separation step because the material at this point in the process is in a water slurry. However, other physical separation techniques including tabling and dry magnetic separation were found to give essentially equivalent results.

A titanium carbide concentrate 19 and a waste stream 20 consisting mostly of calcium hydroxide are recovered from the separation device. It is to be noted that iron oxide contained in the slag fraction 9 is converted substantially completely to iron carbide in the carbiding step. Because of its relatively low melting point, about 1,840°C for pure $Fe_3C$, the iron carbide tends to be dispersed in the calcium carbide matrix. In an elutriation separation, much of the iron carbide present will appear in the waste calcium hydroxide fraction. After dewatering, the calcium hydroxide fraction may be recycled via means 2 as flux back to the smelting step. Iron carbide present in the recycled calcium hydroxide fraction will then be recovered in the pig iron product of the smelting step.

The titanium carbide concentrate 19, recovered from the separation step, will typically have a titanium content, reported as the metal, of about 65% or greater. This corresponds to a titanium carbide concentration of about 80%. Impurities in concentrate 19 consist mostly of carbon in the form of graphite, several percent of calcium hydroxide and small amounts of a variety of metal carbides.

After being dried, the titanium carbide concentrate is introduced into chlorination zone 22 where it is contacted with gaseous chlorine 23 to form a titanium tetrachloride product 24. Chlorination may be carried out in any conventional type of gas-solid contacting device which allows for rather precise temperature control. The reaction between chlorine and titanium carbide is exothermic and proceeds rapidly at temperatures as low as 225°C. Most of the impurity metal carbides as well as calcium hydroxide will also react with chlorine at these conditions to produce the respective metal chlorides. By maintaining the chlorination temperature below the melting point of the impurity metal chlorides formed, a very highly pure titanium tetrachloride product is recovered. Essentially this means maintaining the chlorination temperature below the melting point of ferric chloride or below about 305°C. Allowing the temperature to raise above the melting point of ferric chloride causes a liquid film to form around the reacting particles thus effectively inhibiting further reaction. If the chlorination temperature is increased somewhat more, above about 320°C, then sublimation of the ferric chloride occurs with resulting contamination of the titanium tetrachloride product. In this manner, we are able to avoid the severe problems of removing impurities from the titanium tetrachloride product which are inherent in the conventional processes.

Figure 2:
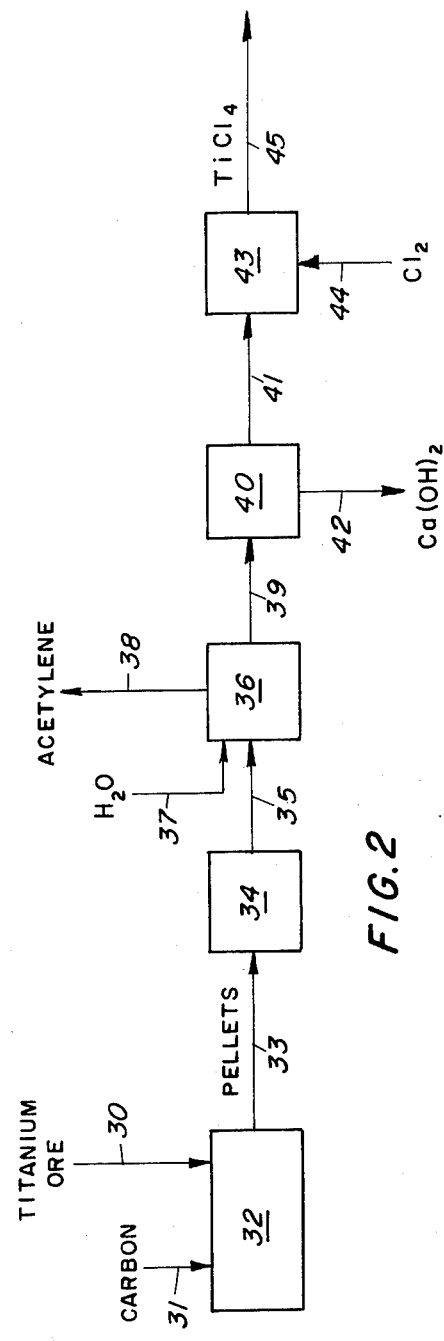

FIG. 2 illustrates another embodiment of our invention utilizing as a feedstock a naturally occurring titanium ore such as perovskite or titanite. Both of these ores contain substantial quantities of chemically bound calcium oxide. The composition of perovskite, written in oxide formula form, is $CaO.TiO_2$ while titanite comprises $CaO.TiO_2.SiO_2$.

A calcium-containing titanium ore 30 is mixed with carbon 31 and is formed into pellets by means of pelletizer 32. Pelletizing techniques are well known in the art and pelletizer 32 may comprise a conventional rotating disc machine. Small amounts of binder materials such as bentonite may be added to the mix in order to attain sufficient pellet strength to facilitate subsequent handling. As with the ilmenite slag, carbon is added in an amount somewhat in excess of that needed to satisfy the stoichiometric conversion of calcium and titanium oxides present in the ore to their respective carbides based upon the oxidation of carbon to carbon monoxide.

The pelleted mixture of titanium ore and carbon is passed via means 33 to carbiding furnace 34 wherein the pellets are heated to temperatures above about 1,850°C to form titanium carbide particles within a matrix of calcium carbide. A carbide fraction 35 is removed from the furnace and, after cooling and crushing, is introduced into decomposition reactor 36. Reaction with water, introduced via 37, decomposes the calcium carbide to produce acetylene which is removed via 38. A water slurry of titanium carbide particles, finely divided calcium hydroxide, unreacted carbon and other minor components is then removed from reactor 36 and is passed via conduct 39 to separation zone 40. Titanium carbide fraction 41 is separated from impurity fraction 42, which comprises mostly calcium hydroxide, and is then passed to chlorination zone 43. In zone 43, the titanium carbide is contacted with gaseous chlorine stream 44 to produce a titanium tetrachloride product 45.

The following examples are set out for the purpose of more thoroughly illustrating the various steps and embodiments of our process.

EXAMPLE 1

A sample of perovskite, obtained from an alkalic stock intrusion near Powderhorn, Colorado, was analyzed. The sample contained 31.3% titanium, 21.4% calcium and 6.1% iron, all reported as the metal.

A portion of the perovskite sample was mixed with carbon and fused in a single phase, arc melting furnace. the charge was fed to area between the electrodes by means of a vibratory feeder at a rate consistant with maintaining reaction temperature. Temperatures were measured with a two-color ratio pyrometer which indicated a temperature of approximately 2,400°C in the area between the electrodes and about 1900°C at the periphery of the fused mass. Upon completion of the furnacing operation, the fused charge was covered with charcoal and allowed to cool in the furnace.

When cool, the fused mass was crushed to −10 mesh and a sample was analyzed with the following results:

Table 1

| Component | C | Fe | Ti | Ca | $SiO_2$ | $Al_2O_3$ | MgO |
|---|---|---|---|---|---|---|---|
| Per Cent | 14.9 | 7.19 | 45.6 | 21.0 | 2.49 | 0.60 | 0.23 |

The remainder of the sample was added slowly to water contained in a vessel equipped with a stirring device. Evolved acetylene was burned and the combustion products were exhausted to the atmosphere. Particulate titanium carbide was recovered from the resulting slurry based on differences in physical properties of the titanium carbide, hydrate lime and free carbon present.

EXAMPLE 2

After having proven that the carbiding and separation steps of our process were feasible, we next investigated the effect of the perovskite to carbon ratio in the furnace charge. The particular perovskite sample which we were using required about 4.25 pounds of carbon for the stoichiometeric conversion of 10 pounds of ore to a mixture of calcium and titanium carbides. This calculation was based upon a carbon oxidation to the monoxide.

A series of tests were performed in which the carbon to perovskite ratio in the furnace charge was varied from 4.25 to 6.0 pounds of carbon per 10 pounds of ore. This corresponded to a ratio of 100 to about 140% of the stoichiometric carbon requirement. The mixtures were fused and allowed to cool in the manner described in Example 1. The cooled, fused furnace product was then crushed and reacted with water. A titanium carbide concentrate was then recovered from the resulting slurry by water elutriation. Amount of calcium oxide remaining with the titanium carbide concentrate was taken to be a measure of product quality. Calcium oxide content in the titanium carbide concentrate recovered from that test in which carbon addition was stoichiometric was found to be 17.1% while in the test in which carbon addition was 140% of stoichiometric, there remained but 3.23% of calcium oxide in the concentrate.

EXAMPLE 3

Fused carbide was produced by the method of Example 1 using a carbon to perovskite stoichiometric ratio of 1.4 to 1. A part of the furnace product was crushed to −¼ inch after cooling while a second part of the furnace product was comminuted to −35 mesh. The two samples were then reacted in water and a titanium carbide concentrate was recovered from each by water elutriation. Titanium carbide obtained from the more finely ground material was slightly but not significantly higher in CaO content after separation than that extracted from the coarser material. We concluded that the calcium carbide-water reaction proceeded satisfactorily without the necessity of fine grinding.

EXAMPLE 4

Fused carbide was produced by the method of Example 1 using a carbon to perovskite stoichiometric ratio of 1.4 to 1. After the furnace product was cooled, it was crushed and a number of different samples were reacted with water. The resulting carbide and lime slurries were then subjected to different separation techniques. These separation techniques included short term and long term water elutriation, tabling using a Deister quarter-deck table and dry magnetic separation. Results were as follows:

Table 11

| Separation Method | Product Analysis, % | | Titanium Recovery, % |
|---|---|---|---|
| | Ti | CaO | |
| Elutriation (Short term) | 54.2 | 1.37 | 84.9 |
| Elutriation (long term) | 66.4 | 0.64 | 81.5 |
| Tabling | 57.2 | 2.94 | 82.2 |
| Dry Magnetic | 63.7 | 2.40 | — |

On the basis of these tests, we concluded that water elutriation was our preferred separation technique because it produced a concentrate high in titanium, low in calcium oxide and gave a good overall titanium recovery. An additional important advantage of water elutriation is that the feed material to the separation step is already in the form of a water slurry.

EXAMPLE 5

A titanium carbide concentrate obtained from an elutriation separation, such as that described in Example 4, was subjected to a screen analysis with the following results:

Table III

| Screen (Tyler) Mesh | Percent Retained |
|---|---|
| 48 | 3.1 |
| 65 | 10.7 |
| 100 | 25.2 |
| 150 | 17.2 |
| 200 | 16.3 |
| 270 | 9.9 |
| −270 | 17.6 |

EXAMPLE 6

We next investigated the applicability of our process to high-titania slags produced by the electric furnace smelting of ilmenite. A slag sample was obtained from a commercial source and an analysis was performed. The slag was found to have the following composition:

Table IV

| | Composition, Percent | | | | | |
|---|---|---|---|---|---|---|
| | Ti | Fe | CaO | SiO$_2$ | MgO | Al$_2$O$_3$ |
| Slag | 49.3 | 2.48 | 0.1 | 3.09 | 4.87 | 1.49 |

A 10-pound slag sample was crushed to −35 mesh, mixed with 8.6 pounds of lime and 14.3 pounds of carbon and was then fused in the same manner as was peroskvite described in Example 1. The furnace product was cooled, crushed, reacted with water and concentrated by water elutriation. About 86% of the titanium charged was recovered in the titanium carbide concentrate which analyzed 65.3% titanium and 2.04% CaO. X-ray diffraction analysis of the concentrate showed the principal phases present to be titanium carbide and graphite with calcium hydroxide present in barely detectable amounts.

EXAMPLE 7

A titania slag-lime-carbon mixture of composition similar to that of Example 6 was sintered for 3 hours at 1,450°C. The sintered material was crushed, reacted with water and elutriated to yield a product which analyzed 26% titanium, 22% calcium oxide and 31% carbon. X-ray diffraction analysis was then performed on the concentrate. Only minor amounts of titanium carbide were present with the bulk of the titanium appearing as CaO.TiO$_2$. It is to be noted that carbiding of titanium dioxide will take place as low as about 900°C.

EXAMPLE 8

In previous work with ilmenite smelting, it was found that calcium oxide, added as a fluxing agent to the smelting step, drastically lowered the slag liquidus temperature. An ilmenite concentrate from Valley County, Idaho had the following analysis:

| Component | Wt. % | Component | Wt. % |
|---|---|---|---|
| TiO$_2$ | 33.2 | SiO$_2$ | 3.20 |
| FeO | 29.8 | Al$_2$O$_3$ | .96 |
| Fe$_2$O$_3$ | 27.6 | CaO | .20 |
| MnO | 3.22 | MgO | .09 |

Based upon X-ray diffraction analysis, the sample consisted primarily of ilmenite and hematite.

Conventional smelting of this concentrate yielded a slag of about 80 wt. % $TiO_2$ with a residual FeO content of about 3%. However, the liquidus temperature of such low-iron slags ranged from 1600° to 1700°C. Addition of 5 wt. % CaO (based on ilmenite content) as a fluxing agent in the smelting step yielded a slag with a FeO content of 3.1% but the liquidus temperature was 1,325°C. Hence, calcium oxide addition is advantageously made to the smelting step when the primary feed material to our process is ilmenite.

EXAMPLE 9

A sample of titanium carbide concentrate, obtained in the manner described in the previous examples, was reacted with a pure chlorine stream at 250°C. Titanium tetrachloride was produced at a rapid rate. The tetrachloride produced was collected by condensation; then hydrolyzed and ignited to produce a titanium dioxide product. By chemical analysis, this product contained 60% titanium or essentially pure $TiO_2$. Qualitative spectrographic analysis indicated only traces of impurity metals. The unvolatilized chlorination residue was mainly carbon with some rutile being present along with small amounts of unreacted titanium carbide and lesser quantities of various metal chloride.

The high purity titanium tetrachloride produced by our process makes it admirably suited for titanium metal production or for the preparation of high quality pigments. Since the chlorination temperature is low, problems associated with materials of construction in the normal high temperature chlorination of rutile are alleviated. In addition, the need for a purification step to remove by-product chlorides from the titanium tetrachloride product is eliminated.

We claim:

1. In a process for the production of titanium tetrachloride by the reaction of elemental chlorine with a titaniferous slag obtained from the smelting of ilmenite, the improvement comprising adding a fluxing agent selected from the group consisting of calcium oxide, calcium hydroxide, and limestone to the smelting charge in an amount sufficient to yield a titaniferous slag containing more than 10 percent calcium oxide by weight, reacting said titaniferous slag with carbon at temperatures above about 1,850°C to produce solid titanium carbide particles in a liquid calcium carbide matrix, cooling the mixture of calcium and titanium carbides, crushing the mixture, and reacting it with water to decompose the calcium carbide with the formation of acetylene and the release of titanium carbide particles from the calcium carbide matrix, separating the titanium carbide from solid residues produced in the decomposition reaction and reacting the recovered titanium carbide fraction with elemental chlorine while maintaining the chlorination temperature below the melting point of the impurity metal chlorides formed to produce titanium tetrachloride.

2. The process of claim 1 wherein the calcium oxide content of said titaniferous slag is in the range of 10 to 50 percent by weight.

3. The process of claim 2 wherein the amount of carbon reacted with said titanium oxide and calcium oxide containing material is in excess of that amount required to satisfy the stoichiometric conversion of titanium and calcium oxides to their respective carbides.

4. The process of claim 3 wherein said titaniferous slag has a residual iron content, reported as FeO, of less than 5 percent.

5. The porcess of claim 4 wherein a titanium carbide concentrate is separated from the slurry formed by reaction of water with the carbided titaniferous slag by water elutriation.

6. The process of claim 5 wherein a second concentrate comprising calcium hydroxide is separated from said water slurry and is recycled as a fluxing agent to said smelting step.

7. The process of claim 5 wheren said reaction of titanium carbide with elemental chlorine is performed at a temperature below the melting point of ferric chloride.

* * * * *